United States Patent
Wigsten et al.

(10) Patent No.: US 8,052,559 B2
(45) Date of Patent: Nov. 8, 2011

(54) TENSIONER WITH TWO WAY DAMPER

(75) Inventors: Mark M. Wigsten, Lansing, NY (US); Dale Smith, Groton, NY (US)

(73) Assignee: BorgWarner Inc., Auburn Hills, MI (US)

( * ) Notice: Subject to any disclaimer, the term of this patent is extended or adjusted under 35 U.S.C. 154(b) by 495 days.

(21) Appl. No.: 12/438,782

(22) PCT Filed: Aug. 30, 2007

(86) PCT No.: PCT/US2007/077214
§ 371 (c)(1), (2), (4) Date: Feb. 25, 2009

(87) PCT Pub. No.: WO2008/028026
PCT Pub. Date: Mar. 6, 2008

(65) Prior Publication Data
US 2009/0325750 A1    Dec. 31, 2009

Related U.S. Application Data (60) Provisional application No. 60/824,314, filed on Sep. 1, 2006.

(51) Int. Cl.
*F16H 7/08* (2006.01)
(52) U.S. Cl. .................................. 474/111; 474/109
(58) Field of Classification Search .................. 474/101, 474/109, 111, 117, 135, 140
See application file for complete search history.

(56) References Cited

U.S. PATENT DOCUMENTS

| | | | |
|---|---|---|---|
| 5,246,404 | A | 9/1993 | Ojima |
| 6,322,470 | B1 | 11/2001 | Markley et al. |
| 6,592,482 | B2 | 7/2003 | Serkh |
| 6,955,621 | B2 * | 10/2005 | Wigsten et al. ............... 474/110 |
| 6,960,145 | B2 | 11/2005 | Fraley, Jr. et al. |
| 2002/0160868 | A1 | 10/2002 | Wigsten et al. |
| 2004/0043854 | A1 | 3/2004 | Fraley, Jr. et al. |
| 2004/0152548 | A1 | 8/2004 | Markley et al. |
| 2005/0059518 | A1 | 3/2005 | Joslyn |

FOREIGN PATENT DOCUMENTS

| | | |
|---|---|---|
| EP | 1524453 | 4/2005 |
| WO | 2005121600 | 12/2005 |
| WO | 2008028026 | 3/2008 |

OTHER PUBLICATIONS

PCT Search Report; PCT/US2007/077214; Feb. 12, 2008, 12 pages.
European Search Report for EP07841609; date Feb. 24, 2010; 7 pages.

* cited by examiner

*Primary Examiner* — William E Dondero
(74) *Attorney, Agent, or Firm* — Brown & Michaels, PC (57) ABSTRACT

A tensioner for a power transmission system includes two tensioning arms operatively engaged with the strand of the chain or the belt of the power transmission system. The upper end of each tensioning arm is connected to a two way damper which is pivotally mounted between the upper ends of the tensioning arms. When a pre-determined chain tension overload threshold is reached, the amount of torque required to overcome the coefficient of friction the damper allows the tensioner to adjust the tension in the chain with minimal oscillations and minimal phase change variation.

6 Claims, 8 Drawing Sheets

TENSIONER WITH TWO WAY DAMPER

FIELD OF THE INVENTION

This invention pertains to the field of tensioners for a closed loop power transmission system of an internal combustion engine. The power transmission mechanism may consist of either a chain or a belt, but for purposes of describing this invention, reference is made to a chain. More particularly, the invention consists of a dual arm tensioner for simultaneously tensioning both strands of the chain between the drive and at least one driven sprocket, the tensioner containing an opposing or "two way" damper.

BACKGROUND OF THE INVENTION

A tensioning device is used to control a closed loop power transmission system, such as a chain, as the chain travels between a plurality of sprockets which are connected to the operating shafts of an internal combustion engine. In this system, the chain transmits power from a driving shaft to at least one driven shaft, such as a camshaft, so that, at any point in time, part of the chain might be slack while part is tight. It is important to impart and maintain a controlled degree of tension on the chain to prevent noise, slippage, or the unmeshing of teeth as in the case of a toothed chain drive system. Prevention of such slippage is particularly important in the case of a chain driven camshaft of an internal combustion engine because the jumping of teeth from the camshaft sprockets will throw off engine cam timing, possibly causing damage to the engine or rendering it totally inoperative.

In the harsh environment of the internal combustion engine, numerous factors cause fluctuations in tension along any given portion of the chain at any time in its rotational cycle. For instance, extreme temperature changes and differences in the coefficients of thermal expansion between various components of the engine can cause tension on the chain to rapidly alternate between high and low levels. Further, after prolonged use, wear to the components of the power transmission system results in a progressive decrease in chain tension. In addition, camshaft and crankshaft induced torsional vibrations result in considerable variations in chain tension. For example, the reverse rotation of an engine, such as that which occurs during stopping of the engine or in failed attempts at starting the engine, can also cause significant fluctuations in chain tension. For these reasons, a mechanism is desired to remove excessive tensioning forces on the tight side of the chain while, at the same time, ensuring that adequate tension is applied to the slack side of the chain.

Hydraulic tensioners are a known device for maintaining proper chain tension. In general, these mechanisms employ a lever arm that pushes against the chain on the slack side of the power transmission system. Hydraulic pressure urges a piston against the lever arm, which in turn, forcibly engages the chain to tighten it during slack conditions.

Blade spring tensioners are also commonly used to control a chain or belt where load fluctuations are not severe enough to overly stress the springs. A conventional blade spring tensioner includes a blade shoe having a curved chain sliding surface which maintains contact with the strand of chain with which it is engaged. To increase the amount of tensioning force applied to the chain, at least one blade spring is installed between the blade shoe and the chain sliding surface. A bracket houses the blade shoe and the chain sliding surface. The bracket is securely mounted to the engine by bolts, rivets or other such means. There may be only one mounting means which would allow the bracket to pivot in response to changing tension loads. The pivot point may be at either end of the bracket or in the middle, as required. Alternatively, the bracket may be securely mounted to the engine by two or more mounting means which effectively prevents any pivoting movement of the tensioner. In any case, the mounting means are located adjacent the strand of chain with which the tensioner is engaged. Often, the mounting means are located outside of chain loop itself.

Figure 1:
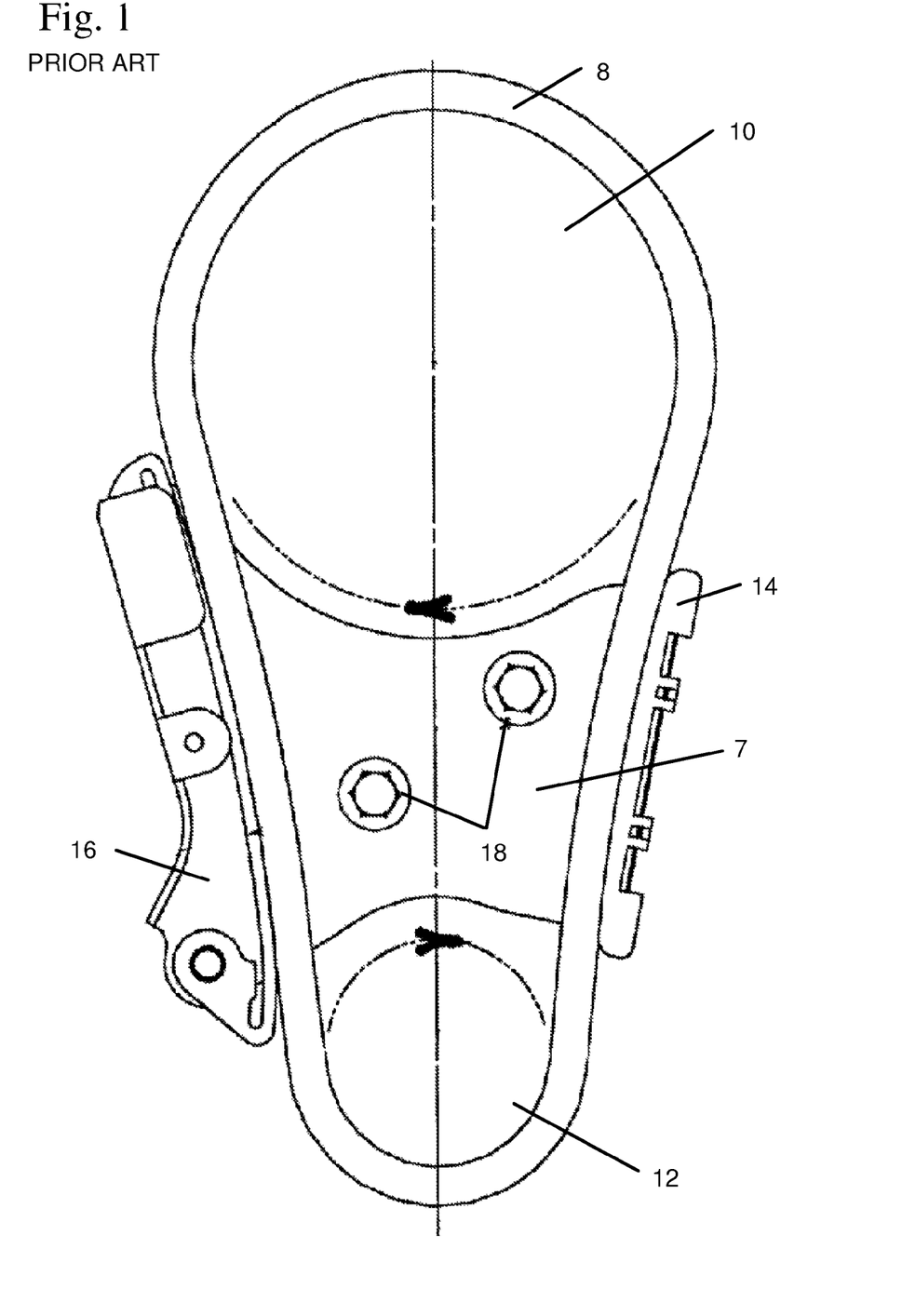
FIG. 1 shows a prior art tensioner operating on one strand of chain while a chain guide contacts the other strand of chain in a closed loop power transmission system.

FIG. 1 provides an image of a conventional chain drive system having a blade tensioner and a guide. A closed loop chain 8 encircles driving sprocket 12 and driven sprocket 10. Each sprocket 10 and 12 accelerates and decelerates independently while maintaining forward motion. A fixed guide 14 is attached to a bracket 7 on the tight strand of the chain. Opposite the guide 14 on the slack strand of the chain is a tensioner 16, which is at least semi-rigidly fixed to the bracket 7 and is biased towards the tight strand of chain. Bolts 18 fasten the bracket containing the tensioner 16 and the guide 14 to the engine block (not shown).

When the driving sprocket 12 accelerates or the driven sprocket 10 decelerates, an energy wave or high local load is created in the tight strand of the chain, which travels from the sprocket that has changed in velocity toward the other sprocket. The chain 8 attempts to span the distance between the portion of the chain in contact with the initiating sprocket to the other sprocket in the shortest possible distance, that being a straight line. The energy moves through the links on the free strand of the chain until it comes to the end of the guide 14, which absorbs the energy. As a result of the constant absorption of the high local load, the ends of guide 14 sustain significant wear. The energy wave can also be present and provide the same result as if it were to have originated in the slack strand. However, the effects of these energy waves may not occur at all depending on how well the tensioner keeps the slack out of the chain.

U.S. Pat. No. 6,322,470 discloses a tensioner that includes a pair of pivoting arms that each simultaneously tensions one of two separate strands of the same chain. A lever with fixed pins is located between the two strands. The arms are pivotally mounted to the fixed pins and extend outside the strands of the chain. They contain shoes that contact the outside portion of the chain. Rotation of the lever causes the fixed pins to move laterally and draw the arms inward to simultaneously impart tension to the separate strands of chain.

Figure 2:
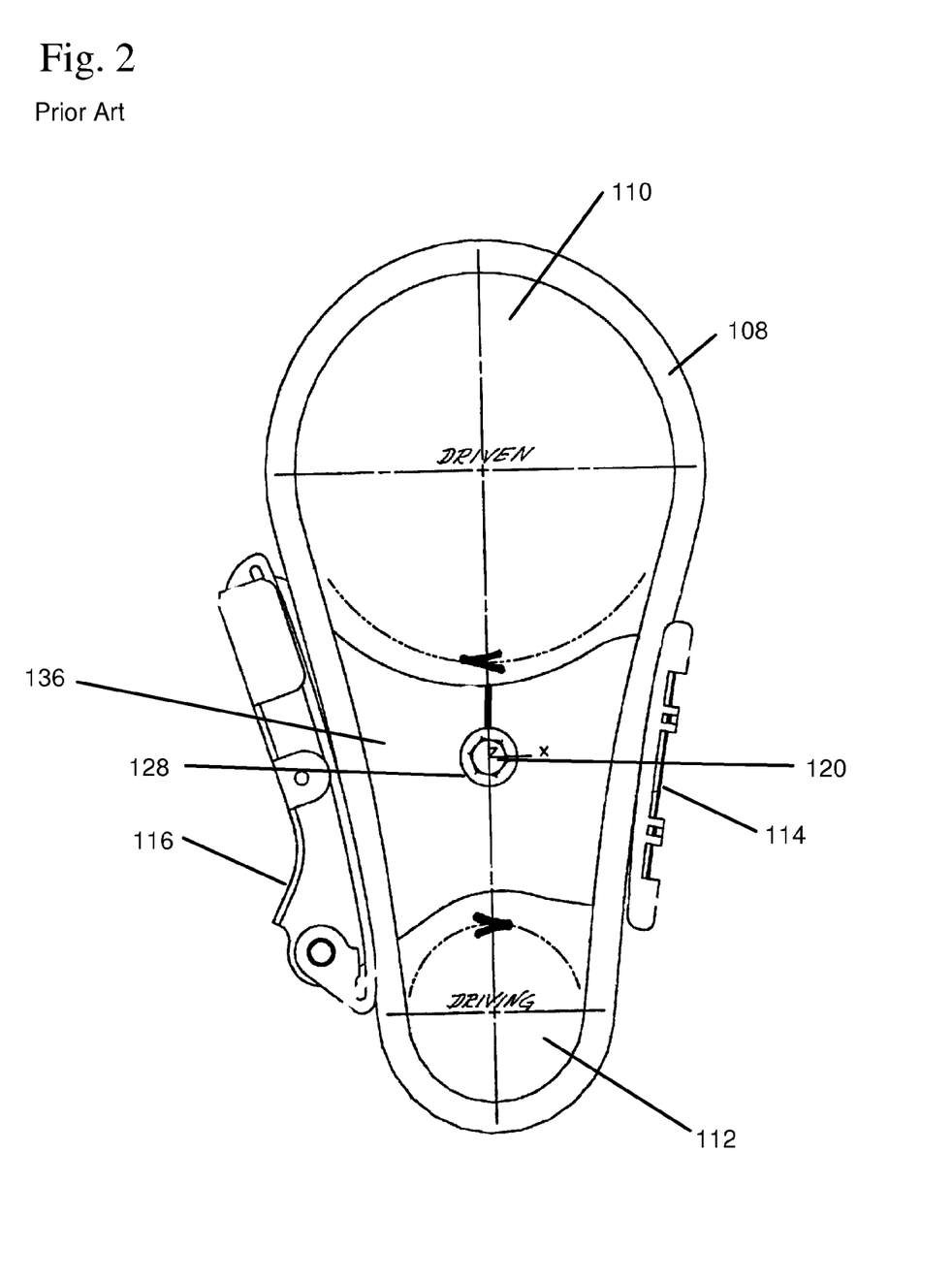
FIG. 2 shows a prior art tensioner similar to the tensioner of FIG. 1 with the exception that the bracket is allowed to pivot about a pivot point located along the center line connecting the central axis of the drive sprocket and the central axis of the driven sprocket.

Referring to FIG. 2, a chain tensioner assembly as disclosed in U.S. Patent Publication No. 2005/0085322A1 is shown. The chain tensioner assembly consists of a tensioner 116 and a chain guide 114, both of which are secured to a bracket 136. The tensioner 116 engages one strand of chain 108 while the chain guide 114 engages the other strand of the chain. The bracket is pivotally mounted to the engine housing at a pivot point 120 which is located in hole 128 between the two strands of the chain and along the centerline that is formed between the central axis of the driving sprocket 112 and the central axis of the driven sprocket 110. The bracket is allowed to pivot about the pivot point 120 in either a clockwise or counterclockwise direction in response to either slack or tight tension conditions.

U.S. Pat. No. 6,592,482 discloses a tensioner for the accessory drive system of an engine. It consists of a pulley located on one end of a pivot arm that is biased toward the drive belt by a torsion spring. The tensioner also contains a one-way clutch coupled with a friction clutch. The pivot arm is biased to move in the direction of the belt, but is prevented from freely retracting until a predetermined torque is reached on the friction clutch. The pulley is only allowed to move away from the belt when the tension on the belt exceeds the combination of the force of the torsion spring and the predetermined torque of the friction clutch.

Similar to the '482 patent, U.S. Patent publication 2005/0059518 A1 discloses an asymmetrical belt tensioner that provides damping when either increased or reduced belt tension occurs. The ability to adjust to either condition is made possible by using a one-way clutch which enables movement in only one direction toward the belt. However, when a certain high level of belt tension occurs, the force of a frictional damper is overcome, thus allowing movement away from the belt.

A typical closed loop chain drive power transmission system will typically have one strand that is tight most of the time during operation while the other strand is correspondingly slack. High damping is usually applied in one direction while low damping is applied in the opposite direction. This is referred to as asymmetrical damping. The conventional tensioners noted above generally place a tensioning device in contact with the strand that is predominantly slack while placing a guide element adjacent the tight strand. These devices are not capable of providing a smooth transition from the predominant tension condition to the opposite tension condition in which the tight strand becomes slack and the slack strand becomes tight. It is desirable to have a tensioner that can smoothly adjust to a reversal in the predominant tension condition of the chain so that a more balanced load is experienced throughout the entire chain system.

SUMMARY OF THE INVENTION

The present invention is a tensioner for a chain driven power transmission system that includes a tensioning arm operatively engaged with each of two strands of the chain that travels between the sprocket of the driveshaft and at least one sprocket of at least one camshaft. The lower end of each tensioning arm is pivotally mounted to the engine. The upper end of each tensioning arm is connected by a linkage to the tensioner which is pivotally mounted to the engine at a location between the upper ends of the tensioning arms. The tensioner acts as a two way damper in that it applies an equal amount of slip torque in both rotational directions of the tensioner. The linkages then transmit substantially equal tension simultaneously to each of the two strands of chain.

Thermal expansion within the various components of the chain drive system, dynamic stretching of the chain or extreme resonances throughout the system may cause the tensioner to over-tension the chain. In order to counteract this condition, the equal opposing forces of the two way damper cause the tensioning arms to maintain a substantially uniform, or symmetrical, tensioning of the entire chain system.

DETAILED DESCRIPTION OF THE INVENTION

Figure 3:
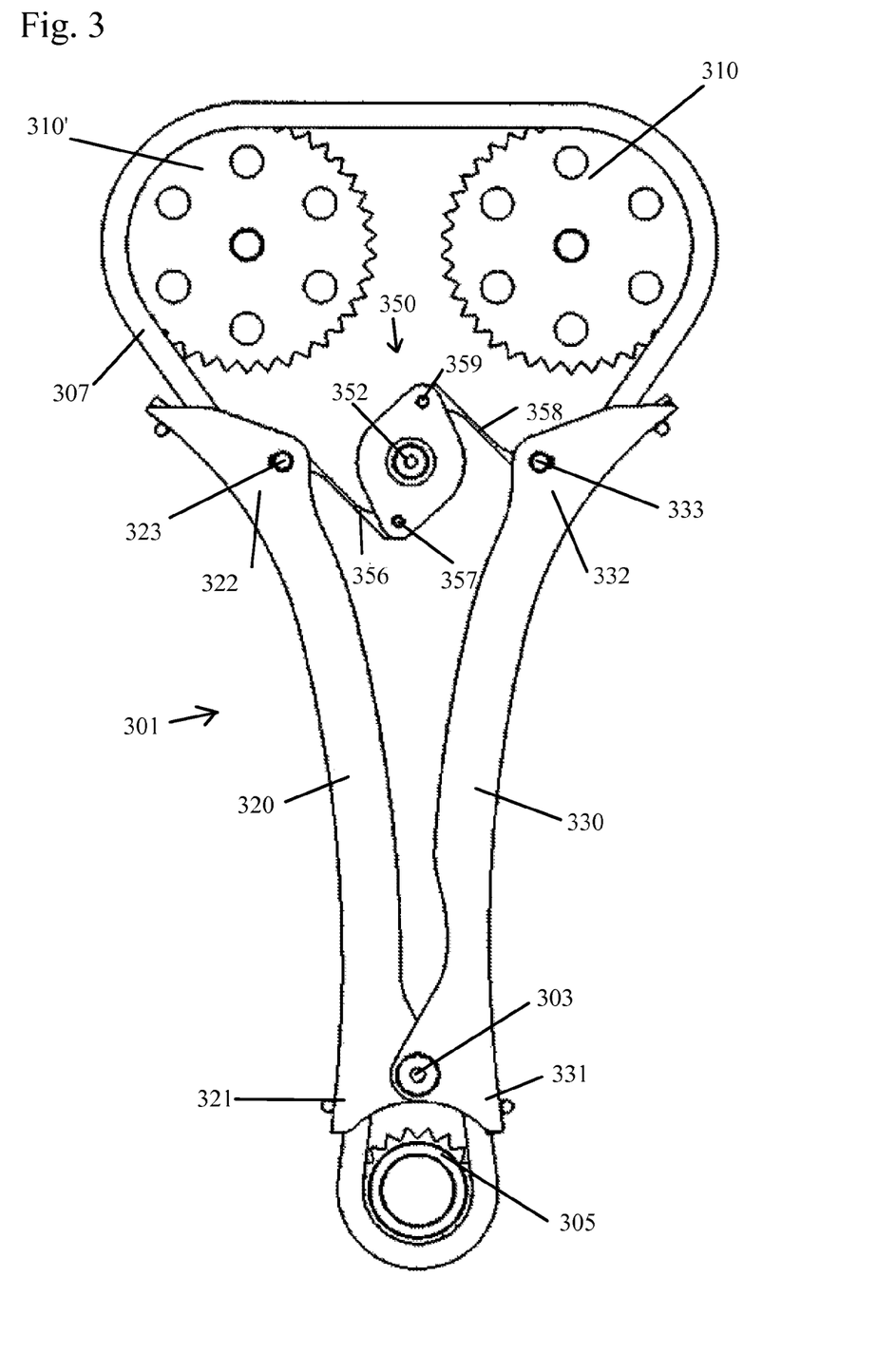
FIG. 3 is a frontal overview of a closed loop power transmission system of an internal combustion engine exhibiting the novel tensioner.

Referring to FIG. 3, an overview of the tensioner 350 of the present invention is shown installed on and in operative engagement with a conventional closed loop power transmission system of an internal combustion engine. The engine configuration represented consists of a drive sprocket 305 engaged with the drive shaft of the engine (not shown) and two cam sprockets 310 and 310', each engaged with their respective cam shafts (also not shown). The cam sprockets 310 and 310' are driven by power provided by through the cam sprocket 305 supplied from a drive transmission device 307, which can be either a belt or chain. Teeth in the drive transmission device 307 securely engage teeth on the outer circumferences of each of the sprockets 305, 310 and 310'. For purposes of this description, the drive transmission device will be referred to as a chain 307.

Engaged with each strand of chain 307 is a left tensioning arm 320 and a right tensioning arm 330. Left tensioning arm 320 has an upper region 322 and a lower region 321. Right tensioning arm 330 has an upper region 332 and a lower region 331. In this embodiment, the lower regions 321 and 331 of it respective tensioning arm, 320 and 330, is connected to the engine housing by a single pivotal mount 303. However, other embodiments may include separate pivotal mounts for each of the tensioning arms. The pivoting action permitted by the pivotal mount 303 allows each tensioning arm to move in response to changes in tension in each strand of chain 307. The tensioner 350 provides a substantially uniform and consistent balanced force between the two strands of chain 307.

Tensioner 350 consists of a substantially planar upper tensioner yoke 355 pivotally connected to a mounting pin 352. The mounting pin 352 is securely affixed to the engine housing by conventional means, such as with threads or through force fitting (not shown). The tensioner 350 is connected to each tensioning arm by linkages. Linkage 356 is connected to the upper region 323 of the first tensioning arm 320 between a first yoke pin 357 and a first upper tensioning arm pin 323. Both the first yoke pin 357 and the first upper tensioning arm pin 323 permit the unimpeded movement of linkage 356. Linkage 358 is connected to the upper region 332 of the second tensioning arm 330 between a second yoke pin 359 and a second upper tensioning arm pin 333. As with the first linkage 356, the second yoke pin 359 and the second upper tensioner arm pin 333 permit the unimpeded movement of linkage 358.

Figure 4:
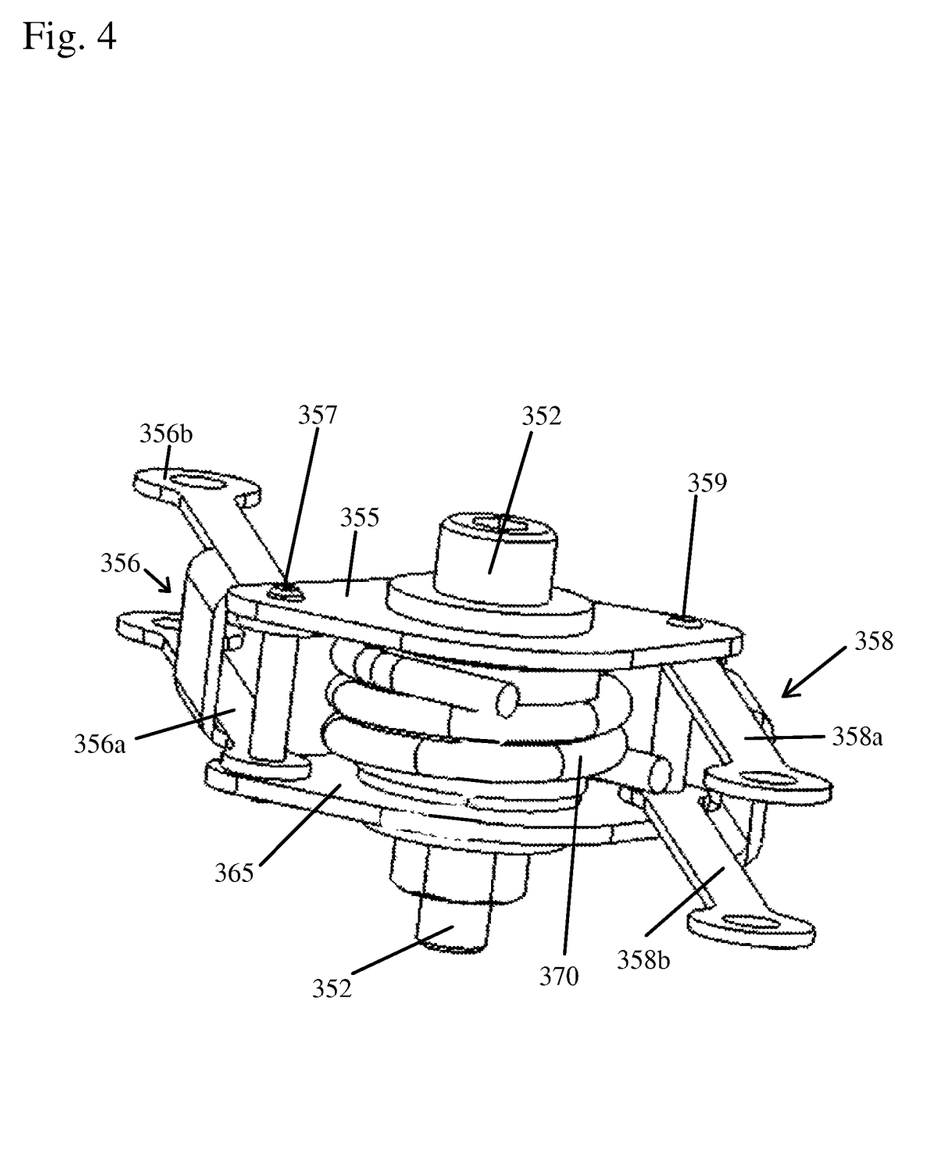
FIG. 4 is an isometric view of the tensioner without the tensioning arms.

FIG. 4 is an isometric view of the tensioner not connected to the tensioning arms 320 and 330. Linkages 356 and 358 are shown as consisting of reinforcing arms 356a and 356b, and 358a and 358b, respectively. Reinforcing arms 356a and 356b pivot about first yoke pin 357. Correspondingly, reinforcing arms 358a and 358b pivot about second yoke pin 359. The configuration shown for linkages 356 and 358 may be varied depending on differing design parameters, such as strength requirements and weight restrictions. In this view, a corresponding substantially planar lower tensioner yoke 365 is shown along with the upper tensioner yoke 355. A torsion spring 370 is shown in the center of the tensioner 350 and positioned between the upper tensioner yoke 355 and the lower tensioner yoke 365.

Figure 5:
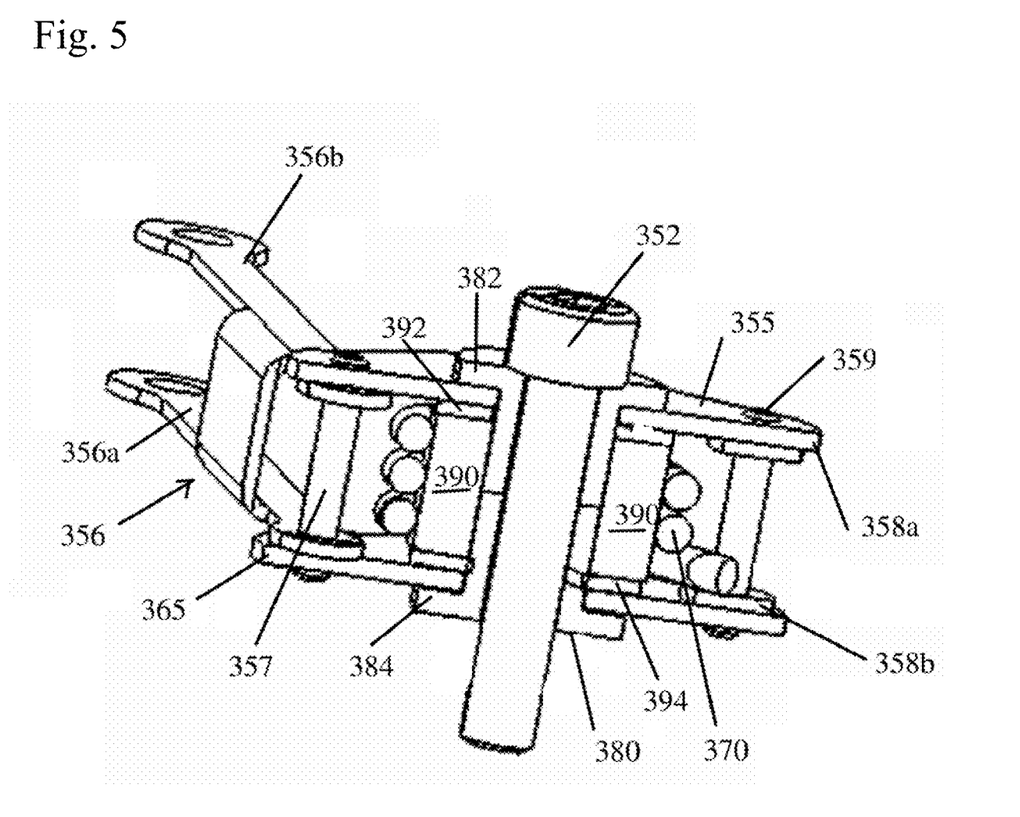
FIG. 5 is a cut-away of only half of the tensioner of FIG. 4 showing the elements that interact as the two way damper.

FIG. 5 provides a cross sectional view of the tensioner 350. Surrounding the mounting pin 352 is a center bushing 380, having an upper annular flange 382 and a lower annular flange 384. A Belleville spring 390 surrounds the center bushing 380. The Belleville spring 390 is separated from the upper tensioner yoke 355 by upper spring bushing 392 and from the lower tensioner yoke 365 by lower spring bushing 394.

The tensioner 350 functions as a torque biased two way damper once it is bolted to the engine. The tensioner mounting pin 352 clamps the center bushing stack, that is, the center bushing 380, the Belleville spring 390, the upper spring bushing 392 and the lower spring bushing 394. Tightening the mounting pin 352 into the engine block (not shown) not only compresses the torsion spring 370 to a specified operating gap but the compression between both the upper tensioner yoke 355 and the upper annular flange 382 and the lower tensioner yoke 165 and the lower annular flange 384 generate a drag coefficient that provides a resistance to the pivotal motion of the tensioner 350. The magnitude of the drag coefficient is determined by the Belleville spring working length from the gap set by the center bushing 380 and the upper and lower spring bushings 392 and 394, respectively. The biased torque to tighten the tensioner is supplied by the size of the torsion spring 370 relative to the space provided between the upper tensioner yoke 355, the lower tensioner yoke 365 and the first and second yoke pins 357 and 359, respectively. One leg of the torsion spring 370 abuts one of the yoke pins while the other leg is grounded to the engine block (not shown).

The most important advantage of the present tensioner design is to reduce the severity of the oscillations in the relative timing between the cam(s) shaft(s) and the crank shaft. The present tensioner 350 achieves this desirable objective, as evidenced by the graphs shown in FIGS. 6-8.

Figure 6:
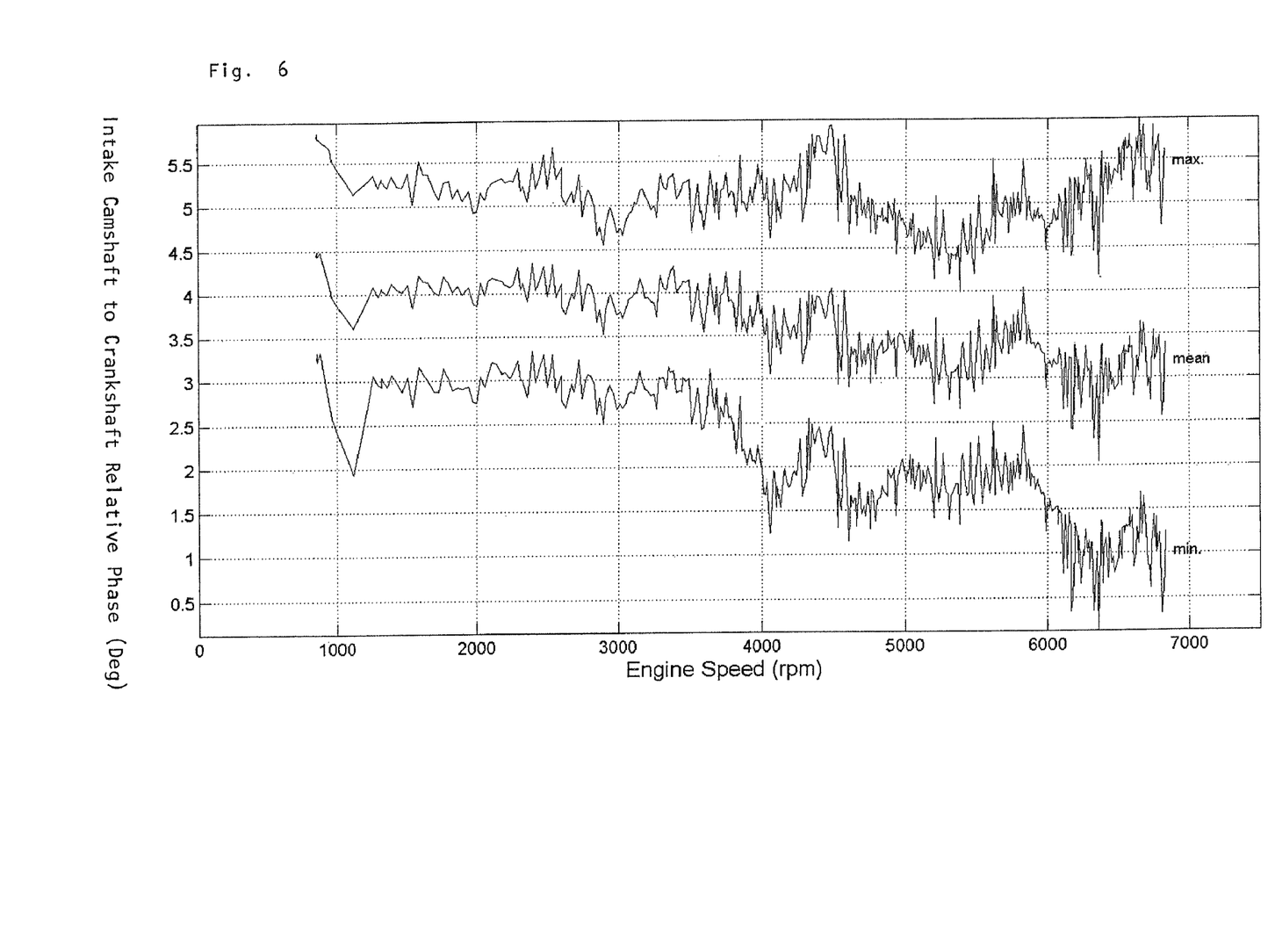
FIG. 6 is a graph of an evaluation of a conventional tensioner on a 2.3 L Mazda engine during engine testing.

FIG. 6 shows the relative phase angle, in degrees, as a function of engine speed on a 2.3L production Mazda engine. The production tensioner was used. The engine test was performed at an ambient temperature of 183° F. and the engine speed was ramped up from @850 RPM to @7000 in @ 60 seconds with the engine in the wide open throttle position (WOT). What is evident are the severe oscillations in the phase angle over the range of −0.05 to over +5.5 degrees.

Figure 7:
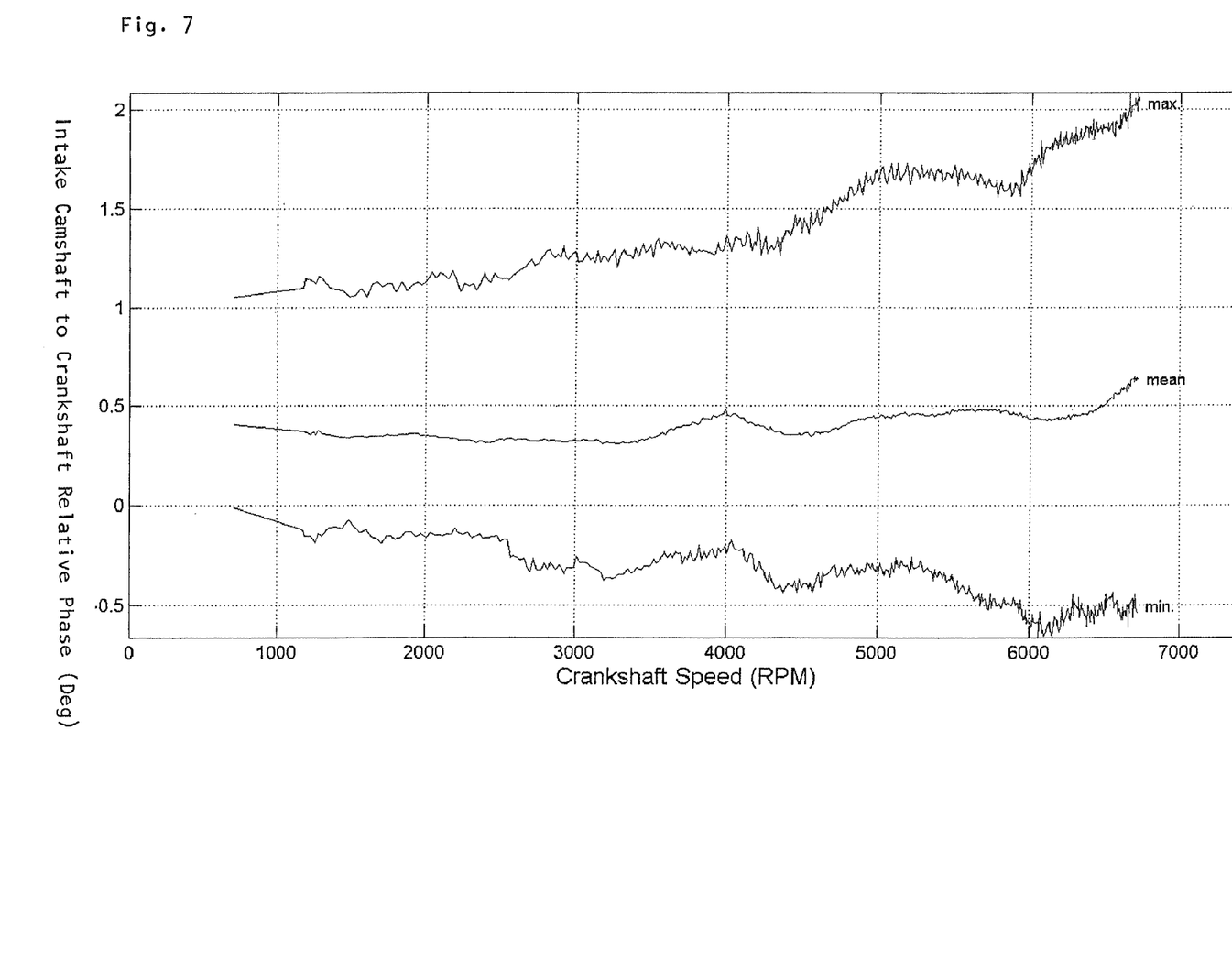
FIG. 7 is a graph of a 1-way clutch tensioner on the same engine and under the same conditions as were used to produce the graph in FIG. 6.

FIG. 7 shows the results of the same test, under the same conditions, except that a 1-way bearing clutch was used. The temperature was 180° F. The clutch was set to slip at between 1 Nm and 2 Nm of torque. Approximately a 350 N spring was used. It is apparent that this tensioner reduced the oscillations seen in the production tensioner and reduced the overall range of variation in the phase angle only between −0.5 and +2.0 degrees.

Figure 8:
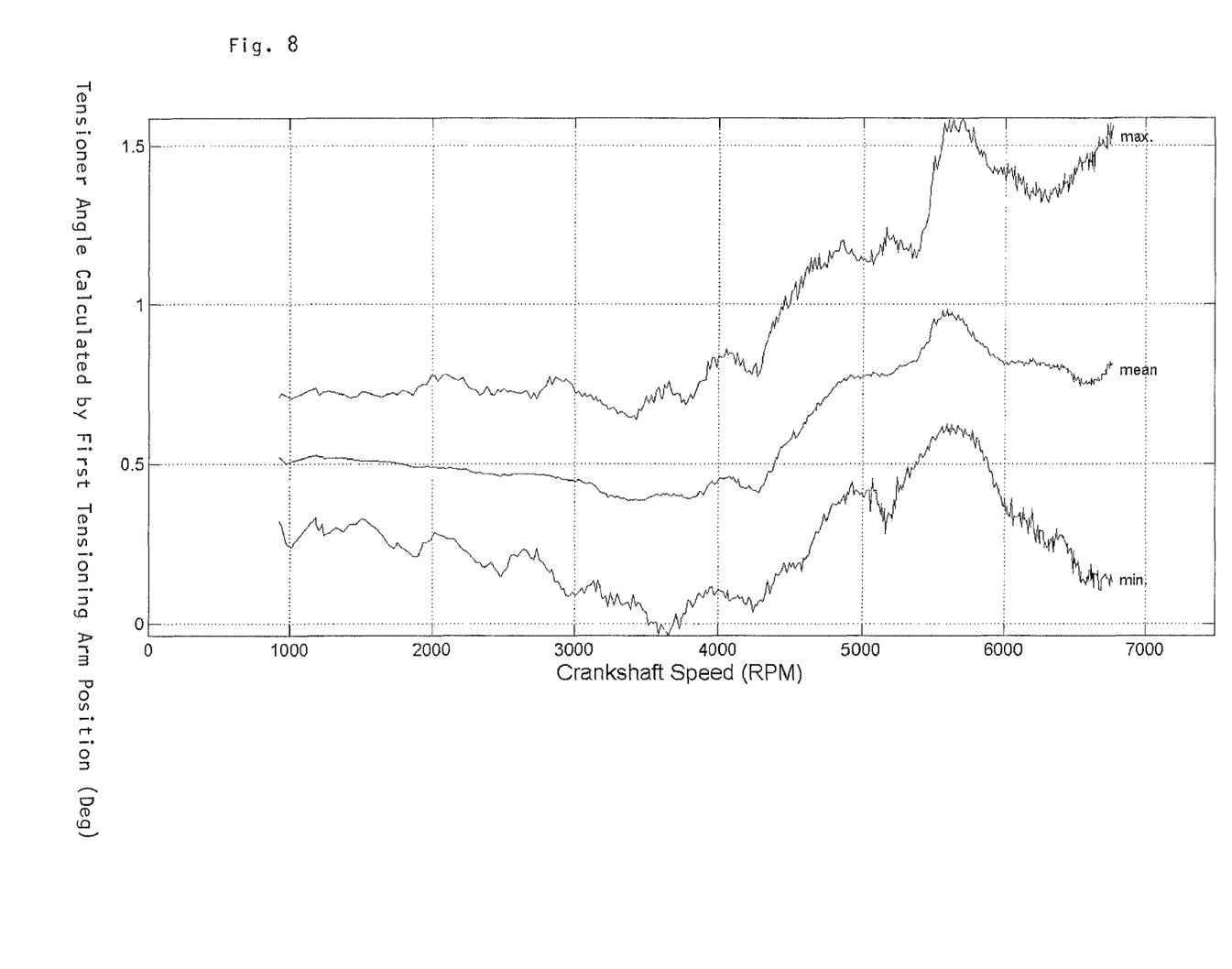
FIG. 8 is a graph of the two way damper of the present invention on the same engine and under the same conditions as were used to produce the graphs in FIGS. 6 & 7.

FIG. 8 represents the tensioner claimed herein. The slip torque was set at between 1 Nm and 2 Nm, as with the 1-way bearing clutch exemplified in FIG. 7. The temperature was also 180° F. All other conditions and components remained the same. The graph shows not only that the oscillations have been minimized (as with the one way clutch), but the phase angle range varied very little up to about 4000 RPM (from @0 to @1.75 degrees) and that the phase angle variation was limited to between @0.2 and @1.5 degrees at 7000 RPM.

It is apparent that the two way tensioner 350 of the instant tensioner design not only minimizes variations in the relative phase timing between the cam(s) and the crank, but it also positively influences the degree of the oscillations in timing error. These advantages not only improve engine performance but functions to reduce wear on various engine components, thus increasing engine life.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for a continuous loop power transmission system of an internal combustion engine, the continuous loop consisting of a chain having a first strand and a second strand, each strand located between a drive sprocket connected to a driveshaft and at least one driven sprocket connected to at least one camshaft, comprising:
   a) a first tensioning arm having a first end, a second end for pivotally mounting to the engine and a chain sliding surface operatively engaging the first strand of chain;
   b) a second tensioning arm having a first end, a second end for pivotally mounting to the engine and a chain sliding surface operatively engaged with the second strand of chain,
   c) a two way damper comprising:
      i) a relatively planar upper tensioner yoke having a center, a first end and a second end,
      ii) a relatively planar lower tensioner yoke having a center, a first end and a second end,
         the upper tensioner yoke and the lower tensioner yoke being disposed relatively coplanar to and spaced apart from each other by a first yoke pin coupling the first end of the upper tensioner yoke and the first end of the lower tensioner yoke and a second yoke pin coupling the second end of the upper tensioner yoke and the second end of the lower tensioner yoke;
      iii) a center bushing stack comprising:
         A) a center bushing passing through the center of the upper tensioner yoke and the center of the lower tensioner yoke, having a center bore for receiving a mounting pin, an upper flange contacting an upper surface of the upper tensioner yoke and a lower flange contacting a lower surface of the lower tensioner yoke;
         B) a Belleville spring surrounding the center bushing;
         C) an upper spring bushing surrounding the center bushing, on an upper side of the Belleville spring; and
         D) a lower spring bushing surrounding the center bushing, on a lower side of the Belleville spring;
      iv) a torsion spring surrounding the Belleville spring comprising a first leg abutting one of the yoke pins and a second leg for coupling to the internal combustion engine; and
   d) a first linkage coupling the first yoke pin to the first tensioning arm and a second linkage coupling the second yoke pin to the second tensioning arm;
   such that when installed upon an engine the torsion spring imparts a biased torque, creating a pivotal motion of the two-way damper about the center bushing, causing the first linkage and the second linkage to move laterally to draw the first tensioning arm and the second tensioning arm inward to apply tension to the first strand and the second strand of the chain; and
   wherein compression of the center bushing stack by tightening the mounting pin creates a drag which resists the pivotal motion, between the upper flange of the center bushing with the upper tensioner yoke and the lower flange of the center bushing with the lower tensioner yoke.

2. The tensioner of claim 1 wherein the two way damper is pivotally mounted to the engine at a location between the first ends of each tensioning arm.

3. The tensioner of claim 1 wherein the first linkage and the second linkage each have at least one reinforcing arm.

4. The tensioner of claim 1 wherein the second end of the first tensioning arm and the second end of the second tensioning arm are pivotally mounted to the engine at the same location.

5. The tensioner of claim 1 further comprising at least one elongated blade spring on the chain sliding surface of the first tensioning arm.

6. The tensioner of claim 1 further comprising at least one elongated blade spring on the chain sliding surface of the second tensioning arm.

* * * * *